United States Patent [19]
Mezger et al.

[11] Patent Number: 5,706,791
[45] Date of Patent: Jan. 13, 1998

[54] LOAD MEASURING DEVICE WITH A ALTITUDE ADAPTION

[75] Inventors: Werner Mezger, Eberstadt; Klaus Boettcher, Oberriexingen; Guenther Heling, Ditzingen, all of Germany

[73] Assignee: Robert Bosch GmbH, Stuttgart, Germany

[21] Appl. No.: 635,948

[22] PCT Filed: Aug. 31, 1995

[86] PCT No.: PCT/DE95/01167
§ 371 Date: Apr. 26, 1996
§ 102(e) Date: Apr. 26, 1996

[87] PCT Pub. No.: WO96/09466
PCT Pub. Date: May 28, 1996

[30] Foreign Application Priority Data

Sep. 24, 1994 [DE] Germany .............. 44 34 265.9

[51] Int. Cl.$^6$ .............. F02D 41/18; F02D 41/04; F02D 41/32
[52] U.S. Cl. .............. 123/571; 73/118.1; 73/118.2; 123/488
[58] Field of Search .............. 123/488, 494, 123/399, 571; 73/118.2, 118.1

[56] References Cited

U.S. PATENT DOCUMENTS

| | | |
|---|---|---|
| 4,718,388 | 1/1988 | Kiuchi .............. 123/478 |
| 4,773,375 | 9/1988 | Okino et al. .............. 123/488 |
| 5,226,393 | 7/1993 | Nagano et al. .............. 123/494 X |
| 5,241,857 | 9/1993 | Schnaibel et al. .............. 73/118.2 |
| 5,481,462 | 1/1996 | Nagai .............. 123/494 X |

FOREIGN PATENT DOCUMENTS

| | | |
|---|---|---|
| 4112540 | 10/1992 | Germany . |
| 4322281 | 1/1995 | Germany . |
| 4336813 | 5/1995 | Germany . |

Primary Examiner—Tony M. Argenbright
Attorney, Agent, or Firm—Michael J. Striker

[57] ABSTRACT

A device for load detection with altitude adaptation is described, wherein the load is determined based on an altitude-dependent main load signal and a collateral load signal not dependent on the altitude. In connection with defined driving conditions it is possible to detect an altitude deviation by comparison of the main load signal with the collateral load signal. The result of the comparison is integrated in an integrator with a variable time constant to form an adaptation factor, by means of which the collateral load signal is then corrected. The time constant of the integrator is changed in such a way that an altitude adaptation takes place as a function of the maximally possible altitude error.

13 Claims, 2 Drawing Sheets

LOAD MEASURING DEVICE WITH A ALTITUDE ADAPTION

BACKGROUND OF THE INVENTION

The invention relates to a device for load detection with an altitude adaptation.

Normally the aspirated air flow is determined with the aid of a heating wire or hot film air-flow sensor to detect the load on an internal combustion engine.

Pulsations of the aspirated air occur within certain operational ranges of the internal combustion engine, which can lead to a distortion of the measured values supplied by the air-flow sensor. This is the case in particular when there is a reverse flow in the range close to full load and the air-flow sensor cannot distinguish between the flow directions and falsely registers the outflowing air as aspirated air.

So that a dependable load determination becomes possible also when a reverse flow occurs, a second load signal, the so-called collateral load signal, could be determined based, for example, on the rpm of the internal combustion engine and the throttle angle. If the control device determines that an operational state exists in which reverse flow could occur, the collateral load signal, instead of the main signal, is used for controlling the internal combustion engine. However, the collateral load signal must be subjected to an altitude adaptation because, in contrast to the main signal, it is not a function of the density of the aspirated air and therefore not of the altitude.

If such an altitude adaptation of the collateral load signal were not performed, load jumps would occur in the course of switch-over between the main and the collateral load signals as soon as the internal combustion engine or the vehicle driven by it is at an altitude not corresponding to a standard altitude.

With presently employed systems the main load signal is limited by an rpm-dependent characteristic curve in the reverse flow range, this limit is also additionally altitude-corrected.

With devices for load determination in connection with internal combustion engines, such as described in the published patent applications DE-P 43 22 281 or DE-P 43 36 813, for example, it is proposed to perform an altitude adaptation for the collateral load signal by forming the difference between the main load signal and the collateral load signal under operational conditions in which a reverse flow can assuredly take place and to perform the altitude adaptation, starting with this difference, which can only be a function of the altitude or the density. As described in DE-P 43 22 281, the filtered collateral signal is subtracted from the also filtered main signal for this purpose, the difference leads to an adaptation value which represents a measurement of the changed density. Under certain operational conditions the comparison result is passed on to an integrator and is integrated in this integrator.

This integrator operates with two different time constants. In the characteristic fields in which an adaptation and therefore the learning of the altitude factor is possible, this learning process mainly proceeds with a relatively slow time constant of the integrator. A compromise between a sufficiently rapid learning speed and signal rest is sought. However, if a departure from the adaptation range is made, there is the danger that a large altitude difference could be traversed without the altitude having been learned. In order to make possible relatively fast learning upon renewed learning operations, i.e. upon reentering the adaptation range, a short switch-over to the rapid adaptation time constant of the integrator is performed. The switch-over criteria between the two time constants are controlled, for example, by means of the length of a performed overrun phase. Following renewed learning, the rapid time constant is allowed for an applicable time and subsequently a switch-over to the Slow time constant is made.

This switch-over between two fixed integrator time constants for the adaptation, known from DE-P 43 22 281, can be unfavorable under certain circumstances. The known system also has the disadvantage that there is no check whether the learned altitude actually is still valid.

SUMMARY OF THE INVENTION

Accordingly, it is an object of the present invention to provide a load measuring device with altitude adaptation, which avoids the disadvantages of the prior art.

In keeping with these objects and with others which will become apparent hereinafter, one feature of the present invention resides, briefly stated in a device for load detection having a first load sensor producing an altitude-dependent main signal, sensor means with an output signaling a collateral load signal dependent of altitude, an evaluation device comparing the main load signals and the collateral load signals under predeterminal conditions, and an integrator which integrates the result of the comparison with a changeable time constant, and an altitude takes place based on the received integration values.

When the device is designed in accordance with the present invention, has the advantage that a more optimal adaptation to the prevailing conditions is possible. By introducing a variable time constant for the integrator, it is possible to perform the altitude adaptation as a function of the maximally possible altitude error, this leads to a very rapid adaptation when large deviations between the actual and the assumed altitude are present. A statement regarding the accuracy or the maximally possible error of the altitude factor is possible at the same time and, in an advantageous embodiment, it is also possible to detect whether the learned altitude is actually still valid.

Further advantages of the device in accordance with the invention ensue from the further steps. It is particularly advantageous that the time constant can be varied continuously in the direction toward a faster limiting value by means of a predeterminable ramp.

DESCRIPTION OF THE PREFERRED EMBODIMENTS

Figure 1:
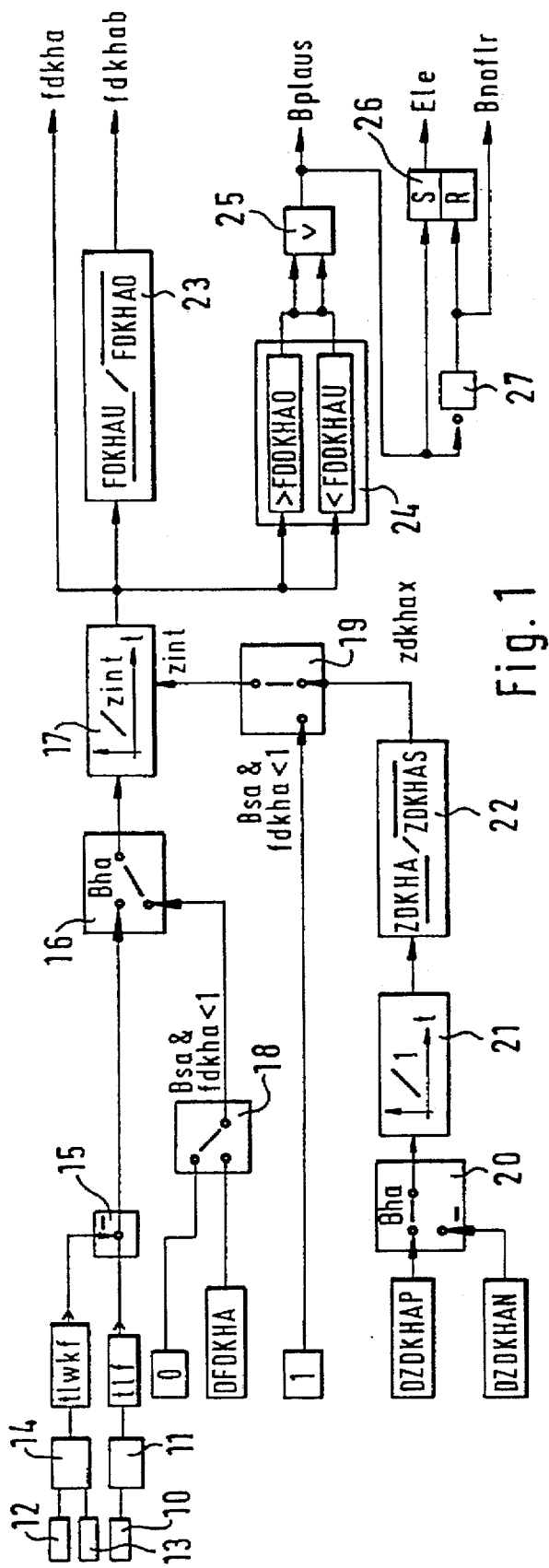
FIG. 1 shows in detail a representation which shows how the factor for the throttle altitude adaptation is determined, wherein error recognition also takes place.

A flow diagram is represented in FIG. 1, which explains how the adaptation factor fdkha or the limited adaptation factor fdkhab are formed from the filtered main load signal tlf and the filtered collateral load signal tlwkf. The filtered main load signal is determined with the aid of an air-flow sensor 10 which detects the air flowing in the aspirating tube of the internal combustion engine. The output signal of the air-flow sensor 10 is further processed in the processing circuit 11 and, among other things, is filtered.

The collateral load signal is formed on the basis of the position of the throttle of the internal combustion engine and of the rpm. The position of the throttle is detected by means of a sensor 12 and the rpm by means of an rpm sensor 13, processing of the signal and the linkage into a load signal takes place with the aid of the circuit arrangement 14, in which filtering of the collateral load signal also takes place.

The difference between the filtered main load signal tlf and the filtered collateral load signal tlwkf is formed in block 15, this difference is forwarded to the integrator 17 via the block 16, wherein forwarding takes place only if the condition Bha for performing an altitude adaptation is met. This condition Bha will be more closely defined in FIG. 2.

If the condition for the altitude adaptation has not been met, the difference formed in the block 15 is not forwarded, a switch-over takes place in the block 16. In this case either a Delta factor for the altitude adaptation DFDKHA is supplied to the integrator 17 or a switch-over to zero is performed, wherein the condition for switch-over in the block 18 is preset in such a way that a switch-over to zero is performed when an overrun fuel cut-off Bsa has been detected and with the assumption that the throttle altitude adaptation fdkha <1.

The time constant zint of the integrator 17 is changed in a suitable manner by means of the functions described below: if the condition overrun fuel cut-off Bsa has been detected and the factor for the throttle altitude adaptation fdkha <1, a factor 1 is supplied to the integrator 17 via the block 19, i.e. the time constant zint is multiplied by one or left unchanged. However, if no overrun fuel cut-off is detected or if the factor fdkha is not 1, the block 19 switches over and supplies the integrator 17 with the time constant for the throttle altitude adaptation zdkhax. This time constant for the throttle altitude adaptation is formed from a Delta time constant which acts in the positive direction (DZDKHAP) of from a Delta time constant which acts in the negative direction (DZDKHAN). Which Delta time constant is forwarded depends on whether or not the condition for the altitude adaptation has been met in the block 20. If it is met, the positive Delta time constant is supplied to a further integrator 21. Based on the integration result in the block 21, a limitation of the time constant for the altitude adaptation to a value ZDKHA for the slow, or ZDKHAS for the rapid altitude adaptation is performed in the block 22. The already mentioned variable time constant for the throttle altitude adaptation or for adjustment of the exhaust gas return flow rate zdkhax is issued at the output of the block 22.

The factor fdkha is generated at the output of the integrator 17, which is used as the factor for the throttle adaptation. A limited factor for the altitude adaptation fdkhab is obtained in the block 23 from the output signal of the integrator 17 by limitation to a lower limit value FDKHAU and to an upper limit value FDKHAO. The lower value represents a lower limit value for the factor for altitude adaptation, the upper one an upper limit value for the factor for altitude adaptation.

A check is made in the block 24 whether the factor for the throttle altitude adaptation fdkha is greater than an upper plausibility limit for the factor of the altitude adaptation FDDKHO, and a check is made whether it is less than a lower plausibility limit for the factor of the altitude adaptation FDDKHAU. These plausibility limits are usually fixed values which are stored in a memory of the control device.

If one of the conditions checked in the block 24 has been met, the condition Bplaus is met at the output of the OR-stage 25, and an implausible value for the factor for the throttle altitude adaptation is recognized.

This condition is supplied to the set input SE of an R-S flip-flop 26, at whose output an error signal Ele for the load detection is issued. The output signal of the OR-stage 25, which is negated in the block 27, is supplied to the reset input R of this flip-flop 26. The condition diagnostic function terminated with an in-order report is issued at the output of the block 27.

Figure 2:
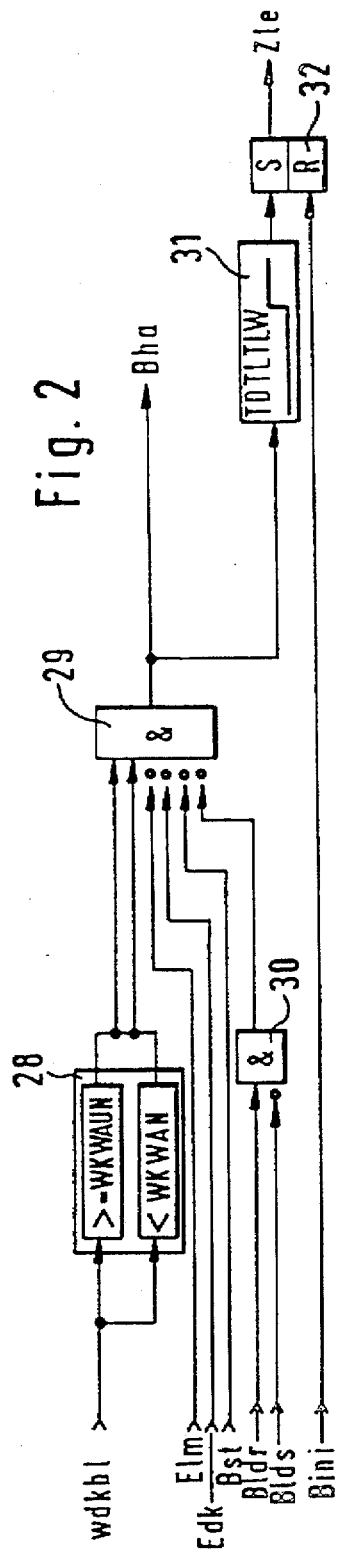
FIG. 2 makes clear what conditions need to be met for an altitude adaptation to take place.

The condition Bha at which, if it is met, an altitude adaptation takes place, is determined in accordance with the diagram represented in FIG. 2. In the process the throttle angle wdkbl, related to idling, is checked in the block 28 to determine whether it is greater than a lower limit Of the throttle angle for the collateral load adaptation WKWAUN. It is also determined in the block 28 whether the throttle angle wdkbl, relative to idling, is less than an upper limit of the throttle angle for the collateral load adaptation WKWAN.

The results of these two checks are supplied to respectively one input of an AND-gate 29 which in addition is supplied with information regarding an error of the main load sensor Elm, an error of the throttle potentiometer Edk and the starting condition Est.

With an internal combustion engine with a turbocharger, a further signal is formed in the AND-stage 30 from the conditions charge pressure regulation active Bldr and charge pressure regulation controlled Blds, which also reaches the AND-stage 29. The information regarding Elm, Edk, Est and the output signal of the AND-stage 30 are first negated before being further processed.

The condition for the performance of an altitude adaptation. Bha is created at the output of the AND-stage 29 only if all conditions supplied to the AND-stage 29 have been met. Bha is of course met in connection with internal combustion engines without a turbocharger without the turbo-specific conditions.

Another time diagnosis is performed in the block 31 from the output signal of the AND-stage 29. In the process a comparison is made with a value TDTLTLW as the time diagnosis for detecting an error in the course of the comparison between the main load signal and the collateral load signal. TDTLTLW acts as a debouncing time for diagnosis.

The output of this time diagnosis is supplied to the set input of a flip-flop 32. The switch-over condition Bini, which represents the initializing conditions, is supplied to the reset input of this flip-flop. A signal Zle is issued at the output of the flip-flop 32 which indicates that an adaptation has taken place once in a drive cycle.

Figure 3:
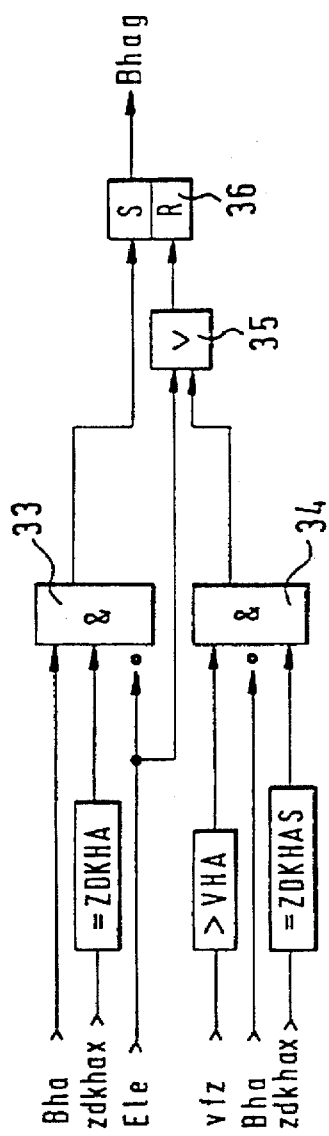
In FIG. 3 it is shown how the condition that a valid altitude adaptation is present is met.

A flow chart is represented in FIG. 3 which shows how the condition Bhag, that the altitude adaptation is valid, is formed. For this purpose the condition for performing an altitude adaptation Bha is supplied to an AND-stage 33. This AND-stage 33 is furthermore supplied a value ZDKHA, formed from the time constant of the throttle altitude adaptation zdkhax, as well as a signal Ele which indicates that the load detection is not defective (Ele negated).

A further AND-stage 34 is supplied with information as to whether the vehicle speed vfz is greater than a limit value VHA. Further information is supplied as to whether the condition for performing an altitude adaptation is not met (Bha negated), and further information as to whether the time constant for the throttle adaptation zdkhax is equal to the time constant for the rapid altitude adaptation following a detected overrun ZDKHAS.

If these three conditions have been met, an appropriate signal is supplied to an OR-stage 34, which is also supplied with the information regarding an error detection of the air-flow sensor.

It is possible to detect at the output of the flip-flop 35 whether the condition for a valid altitude adaptation Bhag exists. The output signal of the AND-stage 31 on the one hand, and the output signal of the OR-stage 34 on the other hand, are supplied to this flip-flop 35. In the process the flip-flop is set when the output of the AND-stage 31 emits a positive signal, and a reset takes place when a positive pulse is emitted at the output of the OR-stage An optimized altitude adaptation can be performed by means of the flow diagrams represented in FIGS. 1 to 3, and at the same time statements regarding the validity of the learned factor are possible and errors can be detected. The last factor formed for the throttle altitude adaptation fdkha is used for adapting the collateral load signal tlw to the altitude. Adaptation takes place only if no error of the air-flow sensor and no error of the throttle pick-up has been noted and if the throttle angle wdkbl, relative to idling, lies between the predetermined thresholds. With turbo-engines the area of the charge pressure regulation is additionally omitted.

Figure 4:
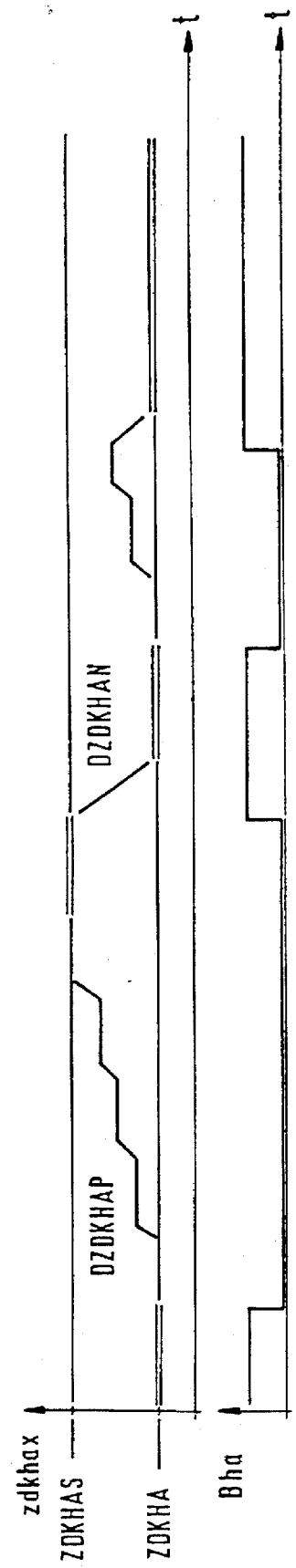
FIG. 4 shows the course of the integration factor over the time and the presence of the switch-over condition for the altitude adaptation, also over time.

Adaptation takes place by means of the integration of the difference between the filtered load signal tlf and the corrected and filtered collateral load signal tlwkf. By means of the method described in FIG. 1 it is assured that the time constant zdkhax of the integrator varies in an optimal manner. In FIG. 4 it can be seen by way of example how the time constance varies. The normal value ZDKHA is the initialization value for the time constant. This is the time constant for the slow altitude adaptation. If no altitude adaptation can take place because the switch-over conditions Bha are not met, the time constant zdkhax is slowly increased, for example at the rate DZDKHAP. In this way it is assured that it will be possible to adapt faster during the subsequent adaptation. Thus the error which has been compounded because of prevented adaptations is compensated as rapidly as possible.

If the adaptation can take place, i.e. the condition has been met, the time constant zdkhax is again rapidly reduced, for example at the rate DZDKHAN since, following the compensation of the compounded errors, it is intended to adapt with the normal, i.e. slow, time constant for the altitude adaptation ZDHKA. By means of this it is achieved that short-time differences between the two load signals, i.e. between the main load signal and the collateral load signal, such as can be typical in the dynamic case, do not lead to a misalignment of the altitude factor fdkha.

During overrun operation and with a recognized altitude, i.e. when the adaptation factor for the throttle angle adaptation fdkha <1, the adaptation factor increases at the rate DFDKHA. By means of this it is achieved that during slow downhill running with overrun, during which there is no adaptation possible, the altitude factor is corrected in the direction toward a lower altitude. Since this can only be a rough guess, it is practical to set the value DFDKHA such that the correct adaptation of the altitude factor takes place during downhill driving over a minimal grade, in which SA is barely reached and an adaptation is prevented.

An additional threshold value interrogation of the unlimited factor is used as a plausibility check of the load signal/collateral load signal adaptation. Upon falling below the lower limit value FDDKHAU or when exceeding the upper limit value FDDKEAO, errors in the adaptation are recognized, in this case the condition Ele error in the load detection, is met. The reason for this can be an erroneous main load signal tlf of the hot film airflow sensor if, for example, the throttle potentiometer or the bypass selector are defective.

In the end, the method in accordance with which the altitude adaptation in the control device of the internal combustion engine is performed operates with two applicable time constants for the integrator, in that the deviation between the main load signal and the collateral load signal in case of a possible adaptation takes place. This time constant is upwardly and downwardly limited, the limit values for the actually valid time constant are stored in the memories of the control device.

After a long driving time in the adaptation range the method operates with the slow time constant. Upon leaving the adaptation range, the time constant is continuously displaced in the direction toward the faster limit value by means of a preselectable ramp. The time constant thus becomes faster the longer the stay outside of the adaptation range is.

If the control device notices that a return into the adaptation range has taken place, the time constant for the integrator is again displaced via an applicable ramp in the direction toward a slower time constant. This ramp is clearly applied faster than the ramp in the direction toward the fast time constant. A possible chronological course of the time constant is the one represented in FIG. 4.

With this setting for the time constant, the time constant is dependent on the time in which the internal combustion engine has been outside the adaptation range. With an appropriate driving profile, a larger portion of time outside the adaptation range makes possible traversing over a greater altitude difference with the larger altitude error connected therewith. This altitude error has not yet been corrected, since there was no adaptation range available. It is therefore necessary for a fast adaptation to take place as soon as an adaptation is possible. The time constant which is faster with renewed adaptation does cause the desired fast learning of the new altitude.

If the control device detects the departure from the adaptation range, the last learned Value for the altitude factor is memorized and used for further corrections of the collateral load signal. During a long driving time outside the adaptation range and with an appropriate driving profile, i.e. with a correspondingly long rise or fall of the road, it is possible to traverse an altitude difference which had not been learned. In connection With functions which depend on correct altitude information it is then possible that error functions occur, since the altitude factor calculated in the function run does not correspond to the actual altitude. For this purpose a validity flag is additionally introduced. Thus it is indicated whether the learned and stored altitude factor is still correct. If the internal combustion engine is outside the adaptation range for an extended period of time, the indicator (FLAG) is set back. A comparison between the actually valid time constant and the limit values for the time constant can be performed as a measurement of the time in which the internal combustion engine is outside the adaptation range.

The indicator is usually set when the slow time constant is used. This is the case when the actual altitude has been correctly learned. A further prerequisite is that the internal combustion engine be inside the adaptation range and no errors have occurred in the load determination. Upon leaving the adaptation range, the indicator (FLAG) remains set until the time constant was changed into its fast limit value. This time is selected in such a way that the maximally possible error does not lead to impermissible operational states.

If the adaptation range is left during recognized idle running or at low vehicle speeds, the FLAG remains set, since in this case no change of altitude is to be expected.

We claim:

1. A device for load detection, comprising a first load sensor producing an altitude-dependent main load signal; sensor means having an output producing signals from which a collateral load signal dependent of altitude is generated; an evaluation device which compares the main load signals and the collateral load signals under predeterminable conditions; an integrator integrating a result of the comparison with a changeable time constant to produce integration values; and means for performing altitude adaptation based on the integration values.

2. A device as defined in claim 1, wherein said evaluation device is a control device of an internal combustion engine, said first load sensor being an air-flow sensor, said sensor means including at least one rpm sensor and a throttle pick-up.

3. A device as defined in claim 1; and further comprising a predeterminable ramp arranged so that upon leaving an adaptation range, in time constant of said integrator is continuously adjusted in direction of a faster limit value via said predeterminable ramp.

4. A device as defined in claim 3; and further comprising a second adjustable ramp arranged so that following a return into the adaptation range, the time constant is adjusted in direction of a slow time constant via said second adjustable ramp.

5. A device as defined in claim 4, wherein said first ramp is faster than said second ramp.

6. A device as defined in claim 1, wherein said integrator is formed so that a time constant of said integrator is set as a function of time in which no adaptation is performed.

7. A device as defined in claim 1; and further comprising means for storing a last learned value after leaving an adaptation range and using the stored value for a further evaluation.

8. A device as defined in claim 1, and further comprising from performing plausibility checks by a comparison between the main load signal and the collateral load signal, and issuing an error indication when a deviation between said signals is too great.

9. A device as defined in claim 1; and further comprising means for checking plausibility of an output signal of said integrator, and recognizing an error if said output signal of said integrator does not lie within a predeterminable range.

10. A device as defined in claim 1; and further comprising means for using an output signal of said integrator directly as an adaptation factor.

11. A device as defined in claim 1; and further comprising means for using an output signal of said integrator after a suitable limitation.

12. A device as defined in claim 1; and further comprising means for using an output signal of said integrator as an adaptation factor for an altitude adaptation of a throttle.

13. A device as defined in claim 1; and further comprising means for using an output signal of said integrator as an adaptation factor for adjustment of an exhaust gas return flow rate.

* * * * *